Dec. 31, 1940.       F. C. BEST            2,226,703
              INTERNAL COMBUSTION ENGINE
                   Filed April 21, 1939
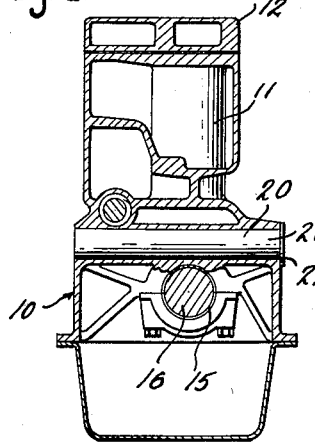
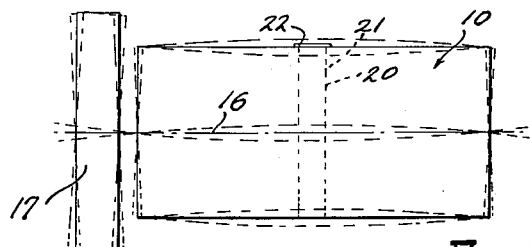
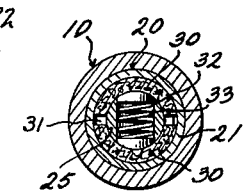
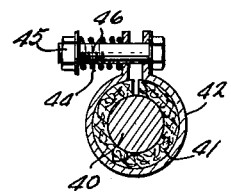
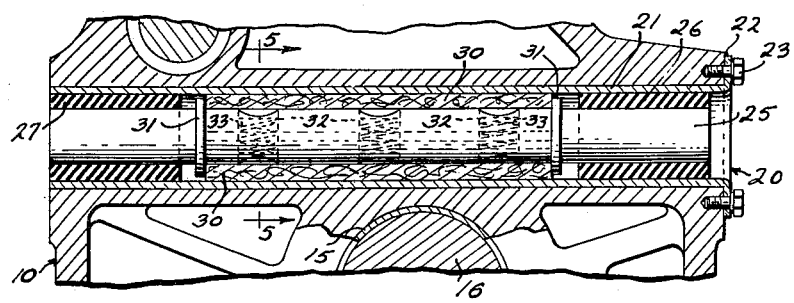
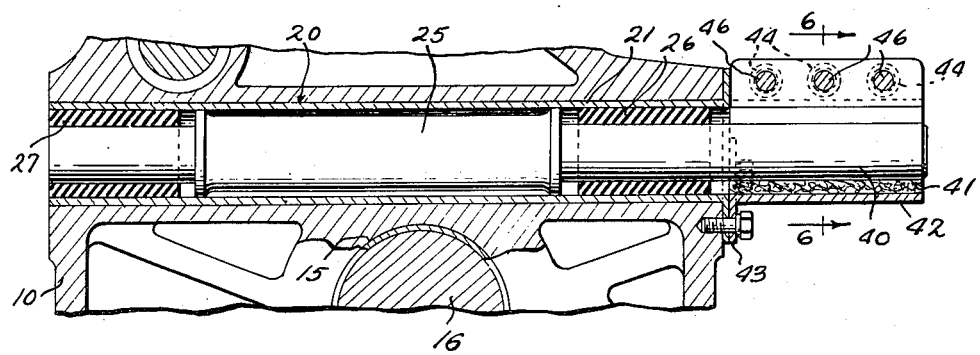
INVENTOR.
Frank C. Best
BY
Tibbetts & Hart
ATTORNEYS Patented Dec. 31, 1940

2,226,703

UNITED STATES PATENT OFFICE 2,226,703

INTERNAL COMBUSTION ENGINE

Frank C. Best, Detroit, Mich., assignor to Packard Motor Car Company, Detroit, Mich., a corporation of Michigan Application April 21, 1939, Serial No. 269,205

12 Claims. (Cl. 123—192)

This invention relates to internal combustion engines, and particularly to means for reducing lateral vibration of the engine structure.

In an internal combustion engine, particularly such as is used in automobiles or aircraft, various vibrations are set up which are the cause of much investigation and research. The greatest care is used in the balancing of the various moving parts of these engines, and yet at the higher speeds in particular there are vibrations which it is difficult to overcome.

In multiple cylinder engines the engine structure, usually termed the crank case (which may or may not be formed integrally with the cylinders), is a casting supporting the main bearings of the crank shaft, and at one end of the crank shaft a flywheel is mounted. The ribbed and webbed construction of the crank case holds the bearings in fairly close alignment, but even with the most accurate machining it is found that at high speeds there will be a certain wobbling of the flywheel, which tends to bend the crank shaft thus placing an alternating lateral pressure on the intermediate bearings of the crank shaft, and this causes a slight deflection or bending of the crank case itself. Thus there is a lateral vibration in the crank case, and the intermediate bearings in particular are subjected to abnormal pressures which may mean undue wear or in some cases a burning out of the bearings, due to squeezing out the lubricant and producing metal to metal contact.

It is an object of the present invention to mitigate the difficulties above described, by partially or wholly damping the above-referred to lateral vibration in the crank case.

It is a further object of the invention to provide a damping means of simple form for the lateral bending or vibration of the crank case of an engine.

Other objects of the invention will appear from the following description taken in connection with the drawing, which forms a part of this specification, and in which:

Figure 1 is a vertical transverse sectional view through the middle portion of an internal combustion engine with the damper of this invention applied thereto;

Figure 2 is a diagrammatic view illustrating the bending action of an engine crank case;

Figure 3 is an enlarged sectional view through the damper means which is shown in elevation in Figure 1;

Figure 4 is another form of the damper means;

Figure 5 is a transverse section through the damper means substantially on the line 5—5 of Figure 3; and Figure 6 is a section substantially on the line 6—6 of Figure 4.

Referring to the drawing, 10 represents the crank case of an internal combustion engine, and this may include as an integral part thereof, the cylinder 11, and the detachable head 12 thereof. In the crank case are several aligned bearings 15 in which is mounted a crank shaft 16. At one end of the crank shaft a flywheel 17 is mounted as diagrammatically shown in Figure 2. Also in Figure 2 the crank case is diagrammatically illustrated at 10, and the crank shaft at 16. In broken lines in Figure 2 the wobbling action of the flywheel 17 is illustrated and this action tends to bend the crank shaft 16, and this movement is in turn transmitted to the crank case so that it is bent slightly in the middle portion, thus producing a lateral vibration. The broken lines of Figure 2 of course greatly exaggerate this movement.

One form of the vibration damper of this invention is shown generally at 20 in Figures 1 and 2, the showing in Figure 2 being merely for the purpose of illustrating that the damper is mounted substantially midway of the ends of the crank case. Preferably the damper 20 is mounted in the crank case adjacent the center main bearing, or one of the main bearings close to the center of the crank case. In Figure 1 it is shown directly over the center main bearing 15, and in a horizontal position. One or more of these dampers may be used, and they may be arranged horizontally or at other angles to the axis of the crank shaft, but preferably in a plane substantially normal thereto.

Referring to Figure 3 it will be seen that the damper 20 comprises a lateral bore in the crank case, and this may be aligned with the tube 21 having a flange 22 at one end, and bolts 23 securing the tube in place. A weight member 25 is mounted in the tube 21, being supported therein for limited longitudinal movement by means of two rubber sleeves 26 and 27, the weight member 25 and the tube 21 being bonded to the internal and external surfaces respectively of these rubber sleeves 26 and 27. Thus the weight member 25 is so mounted in the tube, that it has limited lateral movement relative to the crank case or a limited axial movement in the tube 21, due to the elasticity of the rubber sleeves 26 and 27.

By reason of the inherent friction or hysteresis of the rubber of which the sleeves 26 and 27 are composed, there would be a certain damping action produced by this mounting of the weight 25 in the crank case without any further friction elements. However, the invention also provides additional friction means where it is found to be necessary, and this is in the form of semi-cylindrical friction elements 30, mounted between the weight member 25, and the sleeve 21 between the rubber sleeves 26 and 27, and also between spaced flanges 31 on the weight member. These friction elements 30 are yieldingly pressed in a wall of the tube 21, by coil springs 32, guided in cross bars 33 in the weight member.

By this arrangement the weight member 25 is supported for limited movement in the tube, and this movement is resisted by the friction of the rubber, and the surface friction between the friction elements 30 and the inner wall of the tube. Vibration of the crank case laterally will by this means be damped, and thereby reduced or eliminated.

Referring to the form of the invention shown in Figures 4 and 6, the weight member 25 is mounted in the tube 21 by rubber sleeves 26, similar to the form shown in Figure 3, but in this case the weight member 25 extends outwardly of the tube 21 as at 40, and this extended part 40 is surrounded by a friction element 41, which engages the inner surface of a cylindrical split sleeve 42, having a flange 43 by which it is secured to the crank case, and the sleeve 42 is yieldingly compressed by one or more springs 44, the tension of which is adjustable by a nut 45 on a bolt 46. With this construction the degree of friction produced by the friction element 41, is more easily adjusted because of the adjustment being outside of the crank case.

It will be understood that various forms of the invention other than those described above may be used, without departing from the spirit or scope of the invention.

What is claimed is:

1. The combination with an engine having a crank case and a crank shaft mounted in bearings therein, of a vibration damping device mounted for horizontal vibration on said engine at a point adjacent said crank shaft and intermediate the ends thereof for damping lateral deflection of the crank case.

2. In an engine, a weight member mounted for limited reciprocation laterally of the crank shaft axis, and friction means governing the action of said weight member.

3. In an engine having a crank case subject to lateral bending, a damper mechanism comprising a weight member supported on the crank case for limited movement in a line normal to the crank shaft axis, and means for retarding the movement of said weight member to dampen the bending action of the crank case.

4. In an engine having a relatively long crank case and multiple bearings for a crank shaft, a vibration damper therefor mounted substantially intermediate the ends of, and operated by, the crank case and arranged to damp lateral vibrations thereof.

5. The combination with an engine crank case having a plurality of crank shaft bearings, a crank shaft mounted in said bearings, and a flywheel at one end of said crank shaft, of a vibration damper supported in the crank case substantially intermediate the ends thereof and comprising a weight member supported for limited lateral reciprocation.

6. The combination with an engine crank case having a plurality of crank shaft bearings, a crank shaft mounted in said bearings, and a flywheel at one end of said crank shaft, of a vibration damper supported in the crank case substantially intermediate the ends thereof and comprising a weight member mounted for reciprocation laterally of the crank shaft and friction means tending to retard the reciprocating movement of the weight member.

7. In an engine, a vibration damper comprising a tube mounted in the engine structure, a weight member in the tube, rubber supporting means for the weight member in the tube allowing reciprocation of the weight member relative to the tube against the shear action of the rubber, and friction means between the weight member and said tube.

8. In an engine, the combination with the crank case thereof, of a vibration damper comprising a tube extending laterally of the crank case, a weight member in the tube, and rubber sleeves mounting the weight member in the tube for limited reciprocation therein.

9. The combination with an engine having a crank case and a crank shaft mounted in bearings therein, of a vibration damping device operated by the lateral vibrations of the engine crank case.

10. The combination with an engine having a crank case and a crank shaft mounted in bearings therein, of a vibration damping device operated by the vibrations of the crank case for damping out lateral deflection of the latter.

11. In an engine, a weight member mounted for limited reciprocation laterally of the crank shaft axis, and two separate friction means resisting the movement of said member.

12. In an engine, a weight member mounted for limited reciprocation laterally of the crank shaft axis, and rubber hysteresis and surface friction means for resisting the movement of said weight member.

FRANK C. BEST.